Figure 4:
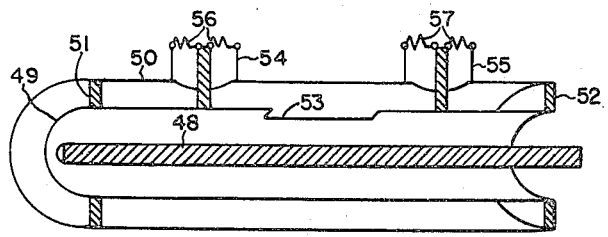

Aug. 12, 1952     H. A. WHEELER     2,606,974
DIRECTIONAL COUPLER
Filed May 16, 1946     3 Sheets-Sheet 1
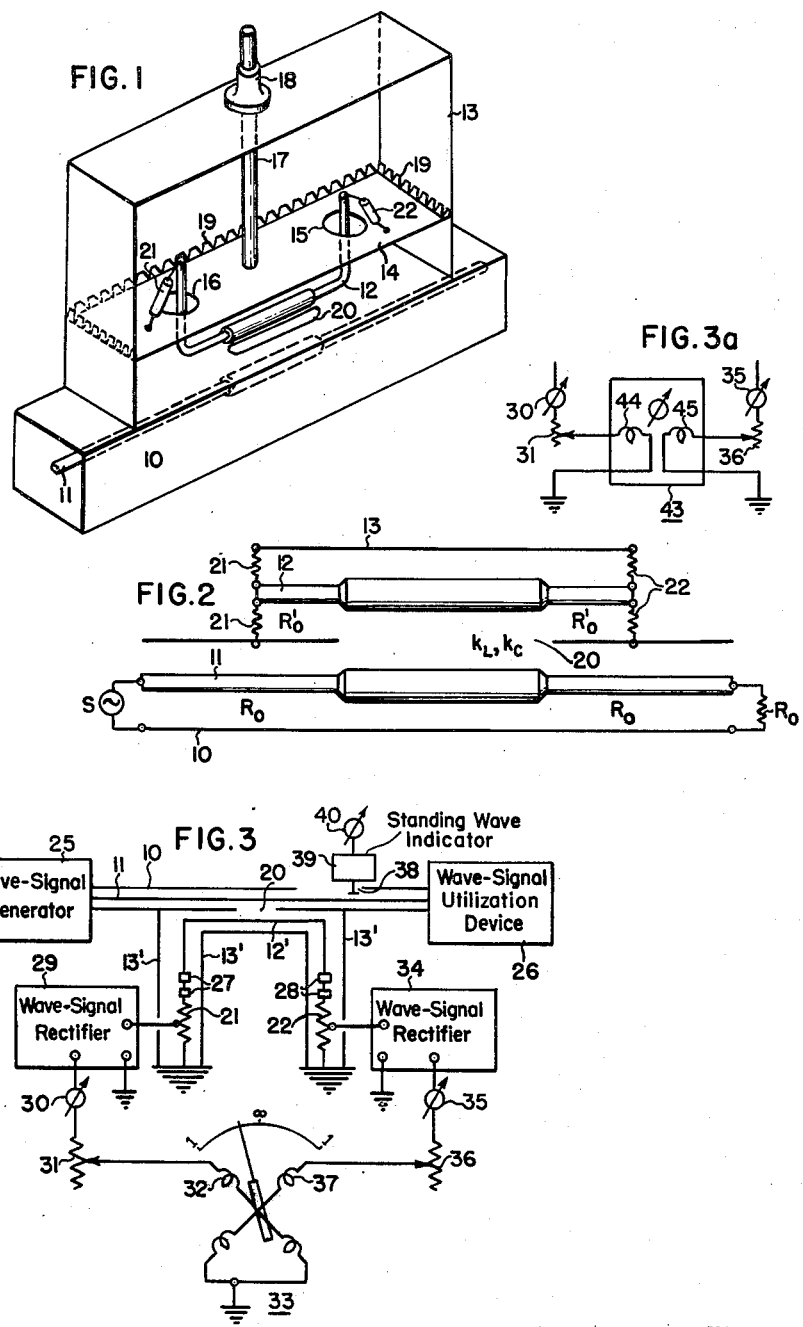
INVENTOR:
HAROLD A. WHEELER,
BY Harry C. Page
ATTORNEY.

Aug. 12, 1952     H. A. WHEELER     2,606,974
DIRECTIONAL COUPLER

Filed May 16, 1946     3 Sheets-Sheet 2

*INVENTOR:*
HAROLD A. WHEELER,
BY
ATTORNEY.

Aug. 12, 1952    H. A. WHEELER    2,606,974
DIRECTIONAL COUPLER
Filed May 16, 1946    3 Sheets-Sheet 3
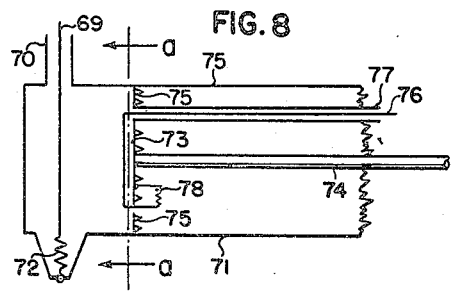
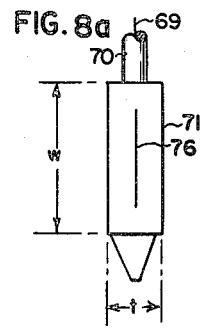
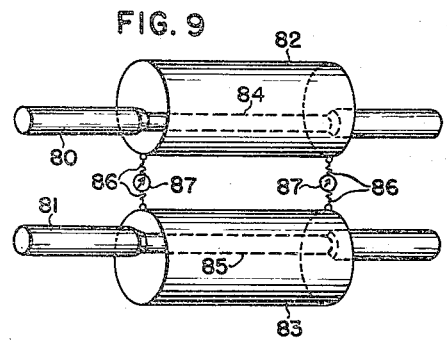
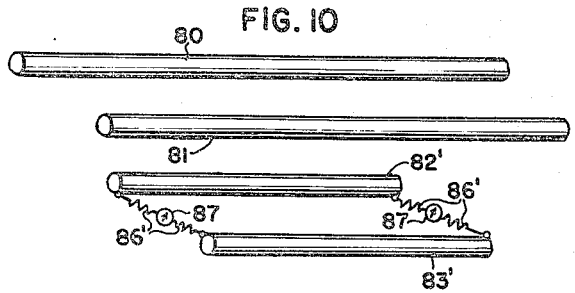
INVENTOR:
HAROLD A. WHEELER,
BY
ATTORNEY.

Patented Aug. 12, 1952

2,606,974

UNITED STATES PATENT OFFICE 2,606,974

DIRECTIONAL COUPLER

Harold A. Wheeler, Great Neck, N. Y., assignor to Hazeltine Research, Inc., Chicago, Ill., a corporation of Illinois Application May 16, 1946, Serial No. 670,081

11 Claims. (Cl. 178—44)

The present invention relates to systems for translating wave signals of various wave lengths and, particularly, to such systems utilizing wave guides such as transmission lines by which to select between wave signals traveling in opposite directions in the same path of propagation.

Wave guides are widely used to guide the propagation of wave-signal energy along a restricted path between two spaced points such, for example, as between a wave-signal transmitter and its associated wave-signal antenna system or between a receiving antenna system and a wave-signal receiver. The term "wave guide" as used in the present specification and claims applies to a system of longitudinal conductive surfaces which act as the lateral boundary of an electric wave and have the ability of directing the propagation of such waves, much as the rigid wall of a speaking tube is used to guide sound by preventing the sound from spreading into space. Wave guides may take the form of a pair of conductors in open space, such as a power line or a telephone line, or may comprise one conductor enclosed within but electrically insulated from a second conductor as in a conventional coaxial transmission line, or may simply comprise a single hollow conductor having such transverse dimensions as to render it capable of propagating an electric wave through the interior of the conductor.

It is usually desirable when using wave guides that the wave-signal energy shall flow along the wave guide only in one direction during a given operating condition of the wave-signal system since this gives rise to maximum efficiency and stability of the system operation. Any wave-signal energy flowing along the wave guide simultaneously in both forward and backward directions results in standing waves of potential and current along the wave guide. The presence of such standing waves thus is often indicative of impaired system efficiency and is conducive to undesirable instability of the system operation.

In certain applications of wave guides, however, standing waves are deliberately created along the wave guide to attain a particular result. Typical of such applications is the radio-frequency impedance-measuring system wherein an impedance of unknown value is coupled to the end of a wave guide of known characteristic impedance and the maximum and minimum values of any standing waves created along the wave guide are observed as a measure of the magnitude and phase angle of the unknown impedance.

In all such applications of wave guides, it consequently is frequently desirable to provide an arrangement for indicating the presence of standing waves as an indication of an undesirable operating condition or for measuring the values of a standing wave as a measure of the unknown value of an impedance which gives rise to the standing wave. Additionally, it often is desirable that the actual value of wave-signal power supplied from a wave-signal source to a load device be easily and readily measured without regard to the presence or absence of standing waves along a wave guide which couples the source to the load device.

Measurements of the maximum and minimum amplitude values of a standing wave, commonly referred to as a measurement of the "standing-wave ratio," and measurement of the power supplied to a load device have heretofore been accomplished by a so-called "slotted wave guide." The slotted wave guide is a section of wave guide preferably longer than one-half wave length and having a longitudinal slot in the outer conductor thereof by which a capacitive-pickup probe or an inductive-pickup loop may be inserted into the electromagnetic field within the wave guide. This probe or loop is movable within the slot longitudinally along the wave guide and the maximum and minimum wave-signal potentials induced on the probe, or currents induced in the loop, are a measure of the existing standing-wave ratio. By proper calibration, the slotted wave-guide arrangement described may also measure the wave-signal power which is dissipated by a wave-signal load device. This prior standing-wave indicating arrangement, while it is extensively used in practice, is not as simple in construction or as convenient in operation as is desirable and is characterized by several well-known limitations and disadvantages.

In certain applications where wave guides are used for wave-signal propagation, it is desirable that the value of wave-signal energy flowing in one direction along the wave guide be selectively measured without the measurement being affected by any wave-signal energy flowing in the opposite direction. One prior arrangement for effecting such measurement includes a loop of wire inserted into the electromagnetic field of a wave guide of the coaxial transmission-line type to provide both magnetic and electric coupling with the inner conductor of the line. This loop within the transmission line is connected between a resistor and indicating circuit. By proper selection of the values of magnetic and electric couplings between the loop and the inner conductor of the line, and the value of the terminating resistor, the magnetic and electric couplings add together in the indicating circuit for a traveling wave of wave-signal energy propagating in one direction along the transmission line but cancel out for a traveling wave in the reverse direction. This arrangement has the important disadvantages that the magnitude of wave-signal energy coupled into the pickup loop decreases rapidly with increasing wave length, so that the arrangement is highly frequency selective. This is caused by the loop being much shorter than one-quarter wave length so that the coupling is small at best, the coefficients of magnetic and electric couplings between the pickup loop and the adjacent length of transmission line being substantially less than unity. There is the additional disadvantage that proper operation of the arrangement necessitates a critical orientation of the pickup loop relative to the axis of the transmission line by which to select the correct value of mutual inductive coupling. In general, the circuit configuration required to attain the desired operation is rather critical and cannot be computed in advance but can be established only by a careful adjustment through the process of trial and error.

It is an object of the present invention, therefore, to provide a new and improved system for translating wave signals and one which avoids one or more of the disadvantages and limitations of prior such systems of the type described.

It is a further object of the invention to provide a system for translating wave signals, which permits a transfer of wave-signal energy from a wave-signal propagation path in free space to a wave guide, or from the propagation path of one wave guide to another wave guide, with the direction and directional magnitude of transferred wave-signal energy flow in the wave guide selectively dependent upon an individual direction and directional magnitude of energy flow in the propagation path.

It is an additional object of the invention to provide a wave-signal translating system, which easily and readily enables accurate measurements to be made of the individual wave-signal energies flowing in each of two directions along a wave-signal propagation path.

It is yet another object of the invention to provide a novel system for translating wave signals, which permits a selectable portion of wave-signal energy traveling along a wave-signal propagation path to be abstracted therefrom selectively in accordance with the direction of energy flow along the path.

It is a further object of the invention to provide a new and improved system for translating wave signals which provides substantially no attenuation to wave signals having wave lengths within a given range of wave lengths but which provides substantial attenuation to wave signals having wave lengths within wave-length ranges located just above or just below the given range. Conversely, the system may be arranged to attenuate wave signals in a given range and to translate without substantial attenuation wave signals in ranges just above and just below the given wave-length range.

In accordance with a particular form of the invention, a wave-signal translating system adapted to be positioned along a path of translation of wave signals having a sustantially planar wave front comprises a wave guide having its longitudinal axis substantially parallel to said path for translating wave signals along a second path with substantially the same velocity as that of the first-mentioned path and including a longitudinally extending elongated aperture, this aperture having a length equal approximately to a quarter wave length at a selected wave length of the first-mentioned wave signals. The aforementioned wave guide also includes at least two conductors having approximately parallel substantially dissipationless conductor portions separated by a distance much less than their length and much less than the wave length of the translated wave signals. The first- and second-mentioned paths have distributed magnetic and electric coupling therebetween through said aperture. The translating system includes means for terminating the wave guide at one end thereof by an impedance having such value that substantially no wave-signal energy is developed at the other end of the wave guide in response to a pure traveling wave traveling through the first-mentioned path in the region of the parallel portions of the aforesaid paths and in a direction corresponding to the direction from the one end to the other end of the wave guide.

For a better understanding of the present invention, together with other and further objects thereof, reference is had to the following description taken in connection with the accompanying drawings, and its scope will be pointed out in the appended claims.

Referring now to the drawings, Fig. 1 illustrates schematically a wave-signal translating system embodying the present invention in a particular form; Fig. 2 represents an equivalent arrangement of the Fig. 1 translating system; Fig. 3 is a circuit diagram, partly schematic, of a measuring system which utilizes a wave-signal translating system of the present invention; Fig. 3a represents a portion of a measuring system of the Fig. 3 type but of slightly modified form; Figs. 4, 5, 7, 8, 8a, 9, and 10 illustrate schematically several modified forms of the invention; and Fig. 6 graphically represents a translating characteristic of the Figs. 5 and 7 modifications of the invention.

Referring now more particularly to Fig. 1 of the drawings, there is illustrated schematically a system for translating wave signals embodying the present invention in a particular form. This system includes a first wave guide, shown as of the coaxial transmission-line type having an outer conductor 10 coaxially surrounding an inner conductor 11, for translating wave signals of the system along a predetermined path and with a substantially planar wave front. The term "wave front" applies to a plane parallel to the mutually perpendicular lines of electrostatic and magnetic flux of the wave. A "planar" wave front is one which inherently has electric-field and magnetic-field patterns varying only in two dimensions, with the only variation in the third dimension being one of time, the energy of the wave signal being propagated in a certain direction without appreciable change of amplitude; that is, the wave-signal energy must not be spreading outward or focusing inward if the wave signal is to have a planar wave front. The term "coaxial" is here used in its broad sense as meaning a line comprising an inner conductor substantially enclosed by a parallel outer conductor; that is, a shielded line having an inner conductor substantially enclosed by its return circuit. In this regard, it may be pointed out that the outer conductor need not in all cases fully enclose the inner conductor, but may have a cross section comprising three sides of a rectangle with the fourth side open since this form of outer conductor adequately shields the inner conductor in many applications. This transmission line will hereinafter be referred to for convenience as the "main" transmission line to distinguish it from a second wave guide, hereinafter called the "side" wave guide, which is included in the wave-signal translating system.

The second or side wave guide, also of the coaxial transmission-line type and presently to be described in greater detail, is positioned to one side of the main transmission line in parallel relation therewith over at least a limited length thereof and is adapted to translate wave signals along a second predetermined path. The side wave guide comprises an inner conductor 12, spaced equidistant from the sides of a rectangular conductive housing 13, supported upon and electrically engaging the outer conductor 10 of the main wave guide. The front side of the housing 13 is normally closed by a conductive wall but is shown open to illustrate interior constructional details. While not so shown, for reasons of clarity, it is preferable that the lengths of the main and side lines be much greater than their diameter and separation.

The translating system includes means for moving the second wave guide in a direction normal to the axis of the first wave guide manually to adjust the coupling between the wave guides, which coupling is provided in a manner presently to be explained, to adjust the magnitude of wave-signal energy transfer between the first and second wave guides. This means comprises a movable diaphragm 14 of conductive material and having apertures 15 and 16 through which the conductor 12 extends. The diaphragm 14 is supported at the end of a rod 17, which may be of conductive or insulating material, the rod in turn being slidably supported by a bushing 18 secured to one wall of the housing 13. The diaphragm 14 is provided around its periphery with conductive spring fingers 19 which engage the interior walls of the housing 13.

The main transmission line 10, 11 and the side transmission line 12, 13 have magnetic and electric coupling therebetween only over limited approximately parallel portions thereof. This coupling is provided by a common, intercommunicating, longitudinal aperture or slot 20 between the main and side transmission lines. The length and width of the aperture 20 establish the magnitude of the magnetic and electric coupling between the main and side lines. Insofar as the length of the aperture 20 is concerned, maximum coupling between the transmission lines is provided when the length of the aperture is equal to one-quarter wave length, or an odd number of quarter wave lengths, at a selected wave length of wave signals translated through the main line. This length of aperture not only provides maximum transfer of wave-signal energy from the main line to the side line, but additionally ensures that the magnitude of energy transfer remains very nearly uniform over a range of wave lengths of translated wave signals.

The translating system also includes means for terminating the side wave guide 12, 13 at a selected end thereof by a resistive impedance, comprising either of a pair of resistors 21 or 22 which is connected between an individual end of the conductor 12 and the diaphragm 14, this impedance having such value that substantially no wave-signal energy is developed at the other end of the side wave guide in response to a pure traveling wave traveling through the first wave guide 10, 11 at the region of the aperture 20 and in a direction corresponding to the direction from the other end of the side wave guide toward the selected end thereof. This resistive termination of the side wave guide will be considered more fully hereinafter.

The electric and magnetic coupling between the lines 10, 11 and 12, 13 over the length of the slot 20 slightly modifies their characteristic impedances at this region. The conductors 11 and 12 are thus provided with enlarged diameters, normally only slightly enlarged due to the small values of coupling but shown somewhat exaggerated in Fig. 1 for purposes of clarity, to preserve uniform the values of characteristic impedance along the entire length of each line for a selected spacing of the conductors 11 and 12 and to minimize undue departures of the characteristic impedance from the desired value for other spacings of the conductors 11, 12.

While the wave-signal translating system of Fig. 1 is illustrated schematically, it will be understood that the inner conductor 11 of the main wave guide is suitably supported in insulated spaced relation to the outer conductor 10 thereof and that the conductor 12 of the side wave guide is supported by suitable insulating means from, but in insulated relation to, the diaphragm 14.

Considering now the operation of the wave-signal translating system just described, and referring to Fig. 2 which represents an equivalent arrangement of the translating system, the characteristic impedance of the transmission line 10, 11 is designated as $R_0$ while that of the side line is designated $R_0'$. A source S of wave signals is shown coupled to one end of the transmission line 10, 11 and this line is shown as terminated in conventional manner by a resistive impedance $R_0$ having a value equal to the characteristic impedance of the line 10, 11.

It can be shown theoretically and experimentally that the coefficient $k_L$ of mutual inductance, or magnetic coupling, between the lines 10, 11 and 12, 13 is equal to the coefficient $k_C$ of capacitive coupling, or electric coupling, therebetween since the longitudinal dimensions of the slot 20 and adjacent lines are much greater than their transverse dimensions. These couplings, however, have such phase relationships that the currents induced in the transmission line 12, 13 by a pure traveling wave of wave-signal energy flowing in the line 10, 11 from the source S to the resistive impedance $R_0$ add in phase at the resistor $R_{21}$ but have opposing phase at the resistor $R_{22}$. If the value of the resistor $R_{21}$ is properly selected, in a manner presently to be explained, no reflection of wave-signal energy occurs at the resistor $R_{21}$. Consequently, a pure traveling wave traveling along the main transmission line 10, 11 in the direction from the source S to the terminating impedance $R_0$ causes wave-signal energy to be developed only across the resistor $R_{21}$ and no wave-signal energy is developed across the resistor $R_{22}$. It will be apparent from this that wave-signal energy is coupled into the side transmission line 12, 13 directionally in accordance with the direction of energy flow in the main transmission line 10, 11. Thus, any energy which travels along the main transmission line 10, 11 in the direction from the terminating impedance $R_0$ toward the signal generator S, such as wave-signal energy caused by reflection at the terminating impedance $R_0$, causes wave-signal energy to be developed only across the resistor $R_{22}$ but causes no wave-signal energy to be developed across the resistor $R_{21}$ if the resistor $R_{22}$ also properly terminates the side line. As a consequence, the measured potentials or currents at the resistors $R_{21}$ and $R_{22}$ provide a measure of the wave-signal energies flowing in each direction along the main transmission line 10, 11. By virtue of this property, the device is called a "directive coupler."

The value of the resistor $R_{21}$ or the resistor $R_{22}$ is equal to the characteristic impedance $R_0'$ of the side transmission line. As previously mentioned, the electric and magnetic coupling between the main and side transmission lines modifies their characteristic impedance over the length of the aperture 20. It is desirable that this portion of the side transmission line, having the characteristic impedance $R_1$, shall properly match the value of characteristic impedance $R_0'$ of the remaining portion of the side line to avoid reflections of wave-signal energy on the side line at the ends of the aperture 20. This matching of impedances is effected by so constructing the side line that the characteristic impedance $R_1$ has a value given by the relation:

$$R_1 = \frac{R_0'}{\sqrt{1-k^2}} \qquad (1)$$

where $k$=the value of either the inductive or capacitive coefficient of coupling between the transmission lines 10, 11 and 12, 13 for a selected value of spacing of the conductors 11, 12.

The value of the coupling coefficient $k$ is given by the relation:

$$k = \sqrt{1-\frac{L_{sc}}{L_{oc}}} = \sqrt{1-\frac{C_{oc}}{C_{sc}}} \qquad (2)$$

where $L_{sc}$ or $C_{sc}$ = the measured inductance or capacitance of the side line 12, 13 for a selected spacing of the conductors 11, 12, as measured at one end of the side line with the other end of this line short-circuited and with short circuits placed on the main transmission line 10, 11 on each side of the aperture 20 spaced a short distance therefrom, and $L_{oc}$ or $C_{oc}$ = the measured inductance or capacitance of the side transmission line 12, 13 as measured in the manner previously described except with the main transmission line 10, 11 open-circuited.

It may be mentioned at this point that the side line causes no reflection of wave-signal energy on the main line when the side line is properly terminated by the resistors 21, 22 as described and is constructed to satisfy Equation 1. Since Equation 1 involves the coupling coefficient $k$ which in turn involves the spacing of conductors 11 and 12, absence of reflection at the slot 20 as last described, occurs only for the selected spacing of the conductors 11, 12 but is minimized for other values of spacing of these conductors.

It is also desirable that the characteristic impedance $R_3$ of the main transmission line over the length of the aperture 20 be such that its modified value match the characteristic impedance $R_0$ of the remaining portions of this line to avoid reflections of wave-signal energy at the ends of the aperture 20. This is effected by so constructing the main line that the characteristic impedance $R_3$ has a value given by the relation:

$$R_3 = \frac{R_0}{\sqrt{1-k^2}} \qquad (3)$$

In a wave-signal translating system of the Fig. 1, type, the coefficient of coupling $k$ is normally made quite small so that the value of the characteristic impedance $R_1$ of the side line is approximately equal to its characteristic impedance $R_0'$. Similarly, and for the same reason, the characteristic impedance $R_3$ of the main line is approximately equal to its characteristic impedance $R_0$. Where larger values of the coefficient of coupling $k$ are desired for a particular application, suitable values of the characteristic impedance $R_1$ of the side line and $R_3$ of the main line as given by Equations 1 and 3 are established by proper selection of either or both the inner and outer conductor sizes of the side and main lines over the length of the aperture 20. This will be explained more clearly in connection with a modified form of the invention presently to be described.

The Fig. 1 wave-signal translating system is so constructed that the value of the coupling coefficient $k$ between the main and side transmission lines may be varied by adjusting the distance between the side line and the main line. Thus, axial movement of the rod 17 varies the spacing between the inner conductor 12 of the side transmission line and the inner conductor 11 of the main transmission line. Increasing the spacing between the conductors decreases the coefficient of coupling $k$ and thus decreases the magnitude of wave-signal energy coupled from the main line into the side line. This modification provides a form of piston attenuator. Since the side line moves always between the planar parallel sides of the housing 13, the coupling varies exponentially with distance as explained in a paper by Harnett and Case, in which the present applicant collaborated, entitled "The design and testing of multirange receivers" which appears in the June 1935 issue of "The Proceedings of the I. R. E.," pages 578 et seq. If desired, a suitable calibration scale may be engraved on the rod 17 giving the attenuation in decibels or other desired units from a given reference output level.

The magnitude of coupling between the main transmission line 10, 11 and the side transmission line 12, 13 varies, of course, with the width and length of the aperture 20. Maximum coupling and uniformity of coupling over a wavelength range are provided, insofar as the length of the aperture is concerned, when the aperture has a length of approximately an odd number of quarter-wave lengths at a selected wave length of wave signals translated through the main wave guide. This length of aperture has the additional advantage that even-order harmonically related wave signals are not coupled from the main transmission line to the side transmission line, or vice versa, a characteristic of substantial advantage in certain applications.

The energy translated to the output terminals of the main transmission line, for any given value of energy applied to the input terminals of the line, is reduced by the value of energy coupled into the side transmission line. The ratio of the value of wave-signal energy at the output terminals of the main line to that at its input terminals is a measure of the efficiency of wave-signal translation along the main line and also is a measure of the value of wave-signal energy coupled into the side transmission line. The manner in which the efficiency of translation varies with the length of the aperture 20, when this length is expressed in radians β of a translated wave signal, is given by the relation:

$$\text{Efficiency} = \frac{1-k^2}{1-k^2 \cos^2 \beta} \quad (4)$$

It will be apparent from Equation 4 that minimum efficiency of translation occurs, with consequent transfer of maximum wave-signal energy to the side transmission line, when the length of the aperture 20 is equal to an odd number of quarter-wave lengths. Maximum efficiency of translation occurs when the length of the aperture 20 is an even number of quarter-wave lengths long. This characteristic of the translating system is particularly advantageous in connection with certain modified forms of the invention, hereinafter to be described, which have such construction that relatively large values of the coefficient of coupling k may easily be attained.

Fig. 3 is a circuit diagram, partly schematic, of a measuring system which illustrates a particular application of a wave-signal translating system embodying the present invention. Elements of Fig. 3 corresponding to similar elements of Fig. 1 are designated by similar reference numerals and analogous elements by similar reference numerals primed. The main transmission line 10, 11 is shown as utilized to couple a wave-signal generator 25 to a wave-signal utilization device 26. The generator 25 may, for example, comprise a wave-signal transmitter and the device 26 a wave-signal antenna. Each end of the side transmission line 12', 13' is provided with a pair of conductive rings 27 and 28, each supported by the inner conductor of the line and movable therealong. These rings are spaced from the outer conductor of the line and have an effective electrical length sufficient to provide an impedance-matching arrangement of the type disclosed and claimed in applicant's copending application Serial No. 563,713, filed November 16, 1944, entitled "High-Frequency Impedance-Matching Device," now Patent 2,403,252, granted July 2, 1946. A wave-signal rectifier 29 has an input circuit coupled across a portion of the terminating resistor 21 of the side transmission line and has an output circuit which includes in series, and in the order named, an ammeter 30, a variable resistor 31, and one winding 32 of a zero-center-scale crossed-coil electrodynamometer 33. A wave-signal rectifier 34 similarly has an input circuit coupled across a portion of the terminating load resistor 22 of the side transmission line and has an output circuit including in series an ammeter 35, an adjustable resistor 36, and the other winding 37 of the electrodynamometer 33. The outer conductor 10 of the main transmission line 10, 11 is provided with a longitudinal slot at least one-half wave length long through which is inserted a probe 38 of a standing-wave indicator 39. This indicator is of conventional construction and includes a wave-signal rectifier for developing a unidirectional potential varying with the wave-signal potential along the line 10, 11 at the region of the probe 38 and includes a meter 40 for indicating the magnitude of the derived unidirectional potential.

Several initial adjustments are made on the measuring system described to adjust it for proper operation and in order that the meters 30, 33 and 35 may be calibrated. The calibration of the meters 30 and 35 is in terms of the wave-signal power flowing in individual forward and backward directions along the main transmission line 10, 11. The meter 33 is calibrated in terms of the ratio of maximum-to-minimum values of standing-wave potential or current developed along the main line. In performing the first adjustment, the device 26 is so designed or adjusted that a pure traveling wave travels along the main transmission line 10, 11 from the generator 25 to the device 26. This condition is indicated by the standing-wave indicator 39 and occurs when the latter indicates that the wave-signal potential along the main transmission line has substantially the same value at all points.

When this operating condition has been established, it will be recalled from the preceding description of the operation of the Fig. 1 arrangement, that all of the wave-signal energy induced in the side transmission line 12', 13' is developed across the terminating resistor 21 and no energy is developed across the terminating resistor 22 if reflection of wave-signal energy does not occur at the resistor 21. Consequently, the second adjustment of the system consists in matching the terminating resistor 21 to the characteristic impedance R₀' of the side line so that no wave-signal energy is developed across the terminating resistor 22 as indicated by the meters 33 and 35. The attainment of this condition may involve some adjustment of the rings 27, in the manner described in the aforementioned copending application.

When this has been done, the side transmission line 12', 13' is bodily reversed with relation to the main line 10, 11 so that the pure traveling wave in the main line develops wave-signal energy only across the resistor 22. The resistor 22 is now likewise matched by sliders 28, so that no wave-signal energy is developed across the resistor 21 as indicated by the meters 30 and 33.

The side transmission line 12', 13' is then again bodily reversed with relation to the main transmission line 10, 11 and a short circuit is placed on the main transmission line at the input circuit of the device 26. This short circuit causes total reflection of the wave-signal energy traveling from the generator 25 to the point of short circuit so that equal wave-signal energies flow in both directions along the main transmission line. The adjustable resistors 31 and 36 are now adjusted until the indicator of the meter 33 is at mid-scale, the point marked "infinity" in Fig. 3.

The short circuit is now removed from the main transmission line 10, 11 at the input circuit of the device 26 again to establish a pure traveling wave on the main line. The meter 30 is now calibrated in terms of the wave-signal power traveling to the device 26, the measurement of power at the device 26 being made in conventional manner. This calibration is made at the frequency of operation of the system comprising the generator 25 and the device 26 or at the mean frequency of the operating frequency range if the units 25 and 26 are to operate over a relatively narrow frequency range. The side transmission line 12', 13' is then bodily reversed and the meter 35 similarly calibrated in terms of power flowing to the device 26. The side transmission line is thereafter bodily reversed to the original condition and the measuring system is now properly adjusted for operation.

The operation of the measuring system described is almost self-evident from the description of the system adjustment. The meter 33 at center scale indicates that equal wave-signal energies are flowing in both directions along the main transmission line 10, 11, a condition of maximum standing-wave ratio along the line. Deflection of the meter 33 to its extreme left-hand position indicates a pure traveling wave traveling from the generator 25 to the device 26. Deflection of the meter 33 to its extreme right-hand position would indicate a pure traveling wave flowing along the main line 10, 11 from the device 26 to the generator 25, which cannot happen in the particular arrangement shown. The wave-signal power flowing along the line 10, 11 from the generator 25 to the device 26 is indicated by the meter 30 while the wave-signal power flowing along the line 10, 11 in reverse direction is indicated by the meter 35.

Fig. 3a is a circuit diagram of a portion of a measuring system similar to that of Fig. 3, similar elements being designated by similar reference numerals, except that the electrodynamometer 33 of the Fig. 3 arrangement is replaced in the instant arrangement by an ammeter 43 having one current winding 44 in the output circuit of the rectifier 29 and a second current winding 45 included in the output circuit of the rectifier 34. The magnetic fields of the windings 44 and 45 oppose one another. The meter 43 is a zero-center-scale type of meter and readings to one side of its center-scale position indicate the net-wave signal power flowing from the generator 25 to the device 26 while deflections of the meter on the opposite side of center scale would indicate a net power flowing from the device 26 to the generator 25. In this case, it is required that rectifiers 29 and 34 be of the square-jaw type, or bee thermal devices, with output current proportional to power.

Fig. 4 illustrates a modified form of the wave-signal translating system of the present invention which is essentially similar in operation to that of Fig. 1 but which involves a slightly different structure. The system of Fig. 4 includes a first or main coaxial transmission line 48, 49 and a second coaxial transmission line positioned in concentric relation outside of the first line with a conductor common to both of the lines. This second or side transmission line comprises an outer conductor 50 and the common conductor 49 and is closed at the ends by conductive apertured discs 51, 52 which support the conductor 50 in concentric relation with the conductors 48 and 49. The common conductor 49 has an aperture or slot 53 dimensioned, as explained in connection with the aperture or slot 20 of the Fig. 1 arrangement, to permit a desired amount of magnetic and electric coupling between the main transmission line and the side transmission line. A coaxial connector 54 is connected to the side transmission line 49, 50 at a point thereon spaced a quarter-wave length distant from that end of the side line which is closed by the disc 51 while a coaxial connector 55 is also connected to the side line at a point spaced one quarter-wave length distant from its other closed end. The connectors 54 and 55 are terminated by respective resistive impedances 56 and 57 properly to terminate the side line as explained above with reference to Fig. 1. In the operation of this modified form of the invention, the portion of the side line between the connector 54 and the adjacent short-circuited end 51 of the line, acts in conventional manner as a quarter-wave impedance transformer short-circuited at its remote end thus presenting high impedance to wave-signal energy at the point of connection of the connector 54. This is characteristic also of that portion of the side transmission line between the connector 55 and the adjacent short-circuited end 52 of the side line. The operation and characteristics of this modified form of the invention are otherwise essentially similar to those of Fig. 1 and will not be repeated.

Figure 5:
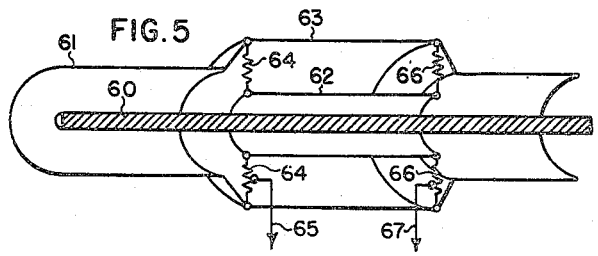
Figure 6:
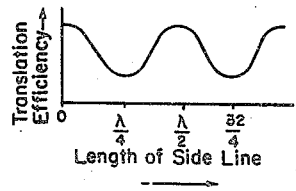

An additionally modified form of the invention is illustrated in Fig. 5 wherein the first or main transmission line is of the coaxial type having inner and outer conductors 60, 61, the outer conductor 61 having a section 63 of enlarged diameter for a purpose presently to be explained. The second or side transmission line also is of the coaxial type and comprises a hollow conductor 62 open at both ends and concentric with the inner conductor 60 of the first line but coextensive with the conductor section 63 and spaced from both of the conductors 60 and 63. Either of the conductors 60 or 63 as desired may constitute the other conductor of the side line and thus be a conductor common to both lines. For reasons of convenience presently to be mentioned, the side transmission line is shown as comprising the conductors 63 and 62. In the present modification, the transmission lines have conductor sizes so selected over the lengths of the second line as to provide a combined impedance for the two lines substantially equal to the characteristics impedance of the first line 60, 61 and to establish between the lines a desired amount of magnetic and electric coupling. This is accomplished in the present arrangement by providing the common conductor 61 of the first and second lines with the section 63 of enlarged diameter. If the characteristic impedance of the first transmission line 60, 61 beyond the second line 62, 63 has a value $R_0''$, the characteristic impedance of the first line will be constant along its entire length if the size of the outer-conductor portion 63 is selected with relation to the diameters of the conductors 60, 62 to satisfy the following relation:

$$R_0'' = \sqrt{R_2(R_1+R_2)} \qquad (5)$$

where $R_2$ = the characteristic impedance of the line section between the conductors 60 and 62, and
$R_1$ = the characteristic impedance of the line between the conductors 62, 63.

Resistive means, comprising one or more resistors 64, 64, is coupled between conductors 62, 63 of the side line at one end thereof for terminating the side line by a resistive impedance having such value that substantially no wave-signal energy is developed at the other end of the side line in response to a pure traveling wave traveling through the main or first line in a direction corresponding to the direction from said one end to said other end of the second line. The value of the effective resistance to be provided by the terminating resistors 64, 64 for this purpose is given by the relation:

$$R_{64} = R_1\sqrt{\frac{R_2}{R_1+R_2}} \qquad (6)$$

This value of resistance is alternatively given by the relation:

$$R_{46} = R_1\sqrt{1-k^2} \qquad (7)$$

where $k$ = the coefficient of electric and magnetic coupling between the main and side lines and has the value:

$$k=\sqrt{\frac{R_1}{R_1+R_2}}$$

In practice it is usually preferable to terminate the other end of the side transmission line by a similar resistive impedance comprising one or more resistors 66, 66 having the same value as the resistors 64, 64. Resistive termination of the side line at only one end maintains uniformity of characteristic impedance through the main line only in one direction; resistive termination of both ends of the side line as last described, maintains uniformity of such impedance through the main line in both directions. Circuit conductors 65 and 67 may be connected to respective ones of the resistors 64 and 66 where the translating system is used as in the measuring system of Fig. 3. The main and side transmission lines have electric and magnetic coupling over the length of the conductor 62 so that the length of this conductor should for maximum coupling, be an odd number of quarter-wave lengths at a selected wave length of wave signals translated through the translating system. The efficiency of the translating system is given by Equation 4 above if $\beta$ of this equation is considered the length in radians of the conductor 62 at the selected wave length.

While the resistors 64, 64 and 66, 66 are shown as coupled between the conductors 62 and 63, thus conveniently to permit conductors 65 and 67 to be connected to the resistors as when the translating system is utilized in a measuring system of the Fig. 3 type, the side line may alternatively be selected as comprising the conductors 60, 62 in which case the terminating resistors 64, 64 and 66, 66 are connected between the hollow conductor 62 and the inner conductor 60. This last-suggested connection of the resistors is satisfactory for certain applications, but requires that the conductor 60 of the first line be hollow if circuit connections are to be completed to the resistors since the circuit conductors must then extend through the last-mentioned hollow conductor. This alternative requires interchanging $R_1$ and $R_2$ in the Formulas 5 to 7.

The operation of the Fig. 5 translating system is essentially similar to that of the Fig. 1 arrangement except that much larger values of the coefficient of coupling $k$ between the main and side transmission lines may be readily attained in the Fig. 5 system. As a consequence of this, the efficiency of translation in the instant arrangement may be made to vary over a much wider range of values with the wavelength values of translated wave signals so that the system may be readily designed to have a frequency-selective translation characteristic or a frequency-selective attenuation characteristic. This characteristic is graphically shown by the curve of Fig. 6, wherein the translation efficiency is plotted against the length of the side line 62, 63 for a fixed given wave length of translated wave signals. It will be seen that substantial attenuation for translated wave signals is effected for a band of wave lengths centered about the wave length at which the conductor 62 is a quarter-wave length, or odd number of quarter-wave lengths, long. Likewise, substantially no attenuation is provided for those wave signals having any wave length within a wave-length band centered upon the wave length at which the conductor 62 is one half-wave length, or an integral number of half-wave lengths, long. This characteristic of the translating system enables it to operate as a frequency-selective attenuator for wave signals traveling in either direction along the main transmission line.

Figure 7:
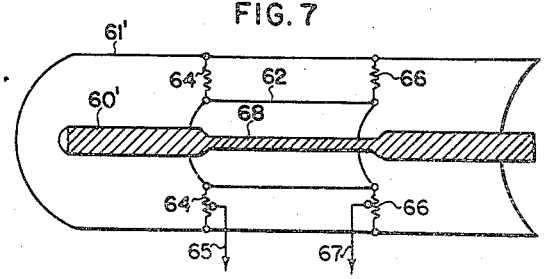

The modified form of wave-signal translating system illustrated in Fig. 7 is essentially similar to that of Fig. 5, similar elements being designated by similar reference numerals and analogous elements by similar reference numerals primed. The size of the inner conductor 60' in a region 68 of length equal to that of the conductor 62 is the same as that of the conductor 60 in Fig. 5, while the outer conductor 61' has a uniform diameter the same as that of the conductor section 63 along its length. Here again, the conductor sizes are selected to satisfy Equation 5 to maintain uniform characteristic impedance along the main transmission line. The operation and characteristics of this modified form of the invention are essentially similar to those of Fig. 5.

Fig. 8, with the cross-sectional view of Fig. 8a, illustrates a wave-signal translating system essentially similar to that of Fig. 1 except that the primary function of the present arrangement is that of a piston type of attenuator. A main transmission line 69, 70 extends into a conductive housing 71 of rectangular cross section and is terminated by a terminating resistor 72 having a value equal to the characteristic impedance of the main line. A conductive plate 73 is movable longitudinally in the housing 71 by means of a rod 74 and has conductive contact fingers 75, as in the Fig. 1 arrangement, which conductively engage the inner walls of the housing. A side transmission line 76, 77 extends through the plate 73 into the housing 71 with the inner conductor of the side line parallel to the inner conductor 69 of the main line where these conductors are exposed to one another within the housing. The side transmission line is terminated by a resistor 78 which corresponds to one of the resistors 21 or 22 of the Fig. 1 arrangement. The width $w$ of the housing is preferably much greater than its thickness $t$ in order that the values of magnetic and electric coupling between the main and side transmission lines shall be determined mainly by the larger planar sides of width $w$. The values of magnetic and electric coupling then vary at the same rate with the displacement of the side line relative to the main line. The center conductor 69 of the main line and the center conductor 76 of the side line should be centered between the sides of the housing in order that the undesired magnetic mode of lower attenuation, which is determined by the width $w$ of the housing, will not be excited or picked up. The exposed conductors of the main and side lines are preferably formed of flat conductor strips to permit closer coupling with reasonable clearance between the conductors. It will be understood that the cross-sectional size of the housing 71 is selected to maintain the characteristic impedance of the main and side transmission lines uniform throughout their length including the portions thereof which lie within the housing.

The Fig. 8 translating system is thus quite similar to that of Fig. 1 except that the inner conductors of the main and side transmission lines are exposed to one another over the entire portion of their lengths lying within the housing 71. For optimum coupling between the main and side transmission lines, the exposed portion of the inner conductor 76 of the side line should thus have a length equal to an odd number of quarter-wave lengths. The operation of the Fig. 8 translating system is essentially similar to that of Fig. 1 and will not be repeated.

An additionally modified form of the invention, essentially similar to the translating system of Fig. 7 but suitable for use with an open pair or balanced type of transmission line, is shown in Fig. 9. The main transmission line is of the open pair or balanced type and includes a pair of parallel conductors 80, 81. The side transmission line comprises a pair of hollow cylinders 82, 83 open at their ends and surrounding respective ones of the conductors 80, 81 of the main line. As in the arrangements of Figs. 5 and 7, the conductors 82, 83 have a length equal to an odd number of quarter-wave lengths for maximum coupling and uniformity of coupling over a wave-length band. Each of the side-line conductors 82, 83 has its axis parallel with the axis of a respective one of the conductors 80, 81 but displaced therefrom by a distance such as to maintain a geometric-mean spacing between the conductors 80, 82 on the one hand, 81, 83 on the other, and a neutral plane midway between the conductors 80, 81. That is, the conductors 80, 81 of the main line have equipotential surfaces surrounding them and the conductors 82, 83 of the side line each are located in individual though equal-and-opposite equipotential surfaces which would exist between the conductors 80, 81 in the absence of the conductors 82, 83.

To maintain uniform characteristic impedance along the main transmission line 80, 81, the conductor 80 has, over the length of the conductor 82, a section 84 of reduced diameter and the conductor 81 a similar section 85 of reduced diameter over the length of the conductor 83. The diameters of the sections 84 and 85 are so selected, both with relation to the diameters of the conductors 82 and 83 and the characteristic impedance of the side line, as to satisfy the following relation:

$$R_0''' = \sqrt{R_2'(R_1 + R_2')} \quad (8)$$

where $R_0'''$ = the characteristic impedance of the main line 80, 81 at a point spaced from the conductors 82, 83, $R_2'$ = twice the characteristic impedance between the line-conductor section 84 and the conductor 82 or between the line-conductor section 85 and the conductor 83, and $R_1$ = the characteristic impedance of the side line 82, 83.

The side transmission line 82, 83 is terminated at one or both ends by a resistor 86 the value of which is given by the relation:

$$R_{86} = R_1 \sqrt{\frac{R_2'}{R_1 + R_2'}} \quad (9)$$

If it is desired to measure the wave-signal power supplied to either or both of the resistors 86, 86, an ammeter 87 may be inserted in series with the resistor at the mid-point thereof.

The operation of the Fig. 9 modified form of the invention is essentially similar to that of Fig. 5 or Fig. 7 and will not be repeated.

Fig. 10 illustrates a wave-signal translating system embodying an additionally modified form of the invention essentially similar to that of Fig. 9, similar elements being designated by similar reference numerals and analogous elements by similar reference numerals primed, except that the side transmission line is comprised of a pair of parallel conductors 82', 83' arranged as an open pair or balanced transmission line with the conductors thereof approximately equally spaced from corresponding conductors 80, 81 of the main transmission line. The circuit parameters of the instant arrangement are given by Equations 1-4, inclusive. Since the conductors 82' and 83' are exposed over their entire length to the electric and magnetic field of the main line 80, 81, maximum coupling and uniformity of coupling between the main and side lines are effected when the side-line conductors have a length equal to an odd number of quarter-wave lengths. The operation of the instant translation system is essentially similar to that of either the arrangement of Fig. 1 or Fig. 8 and will not be repeated.

It is the function of the main transmission line in each of the foregoing described arrangements to guide or effect translation of wave signals along a propagation path and to ensure that such translated wave signals have a substantially planar wave front along the path. The wave front of a wave signal is identified by a plane parallel to the perpendicular lines of electrostatic and magnetic flux of the wave signal. A wave signal having a planar wave front inherently has electric-field and magnetic-field patterns which vary only in two dimensions with the only variation in the third dimension being one of time, the energy of the wave signal being propagated in a certain direction without appreciable change of amplitude; that is, the energy of the wave signal must not be spreading outward or focusing inward if the wave signal is to have a planar wave front. Such two-dimensional field is retained in the main and side lines by making the transverse dimension of the coupling aperture or slot much less than its longitudinal dimension. It will be apparent that the side line 82', 83' of the Fig. 10 arrangement may itself be utilized as a directional coupler for wave signals propagated through free space, the axes of the side-line conductors in such case preferably being positioned normal to the wave front of the propagated signal for maximum energy transfer to the side line. When so utilized, the side line effectively becomes a wave-signal antenna having a unidirectional characteristic and may be utilized as such. The same is true for the coaxial type of side line, such as that of Figs. 1, 2 or 3, for example, where the outer conductor of the side line is provided with a slot or aperture, as the slot 20, by which to effect directional coupling between the side line and a wave signal propagated through free space.

From the foregoing brief discussion of the directional coupling with a wave signal in free space, it will be seen that the wave-signal translating system of the invention is one which is adapted to be positioned along a path of translation of wave signals having a substantially planar wave front and comprises a wave guide for translating wave signals along a second path with substantially the same velocity as that of the first path, the wave guide including at least two conductors having approximately parallel substantially dissipationless conductor portions separated by a distance much less than their length and much less than the wave length of the translated wave signals. These first and second paths have magnetic and electric coupling therebetween only over limited approximately parallel portions thereof. This limiting of the coupling is effected either by selection of the length of the conductor or conductors of the side line which are exposed to the fields of the translated wave signal or is effected by shielding an inner conductor of the side line by an outer conductor thereof and by providing an elongated slot or aperture in such outer conductor by which to permit the magnetic fields of the translated wave signal to penetrate in a certain manner the interior of the shielded side line. The parallel portions of the paths last mentioned have such length in relation to the wave length of the wave signals as to provide a desired amount of coupling between the first and the second paths, a length of the parallel portions equal to an odd number of quarter-wave lengths of the translated wave signals providing maximum coupling as previously mentioned. The translating system of the invention includes means for terminating the wave guide at one end thereof by an impedance having such value that substantially no wave-signal energy is developed at the other end of the wave guide in response to a pure traveling wave traveling through the first-mentioned wave-signal propagation path in the region of the parallel portions of the paths and in a direction corresponding to the direction from the aforesaid one end to the aforesaid other end of the wave guide.

The energy transfer from the wave-signal propagation path to the propagation path of the wave guide varies with the wave length and with the length of the parallel portions of these paths over which the magnetic and electric coupling is permitted even though the coefficient of such coupling remains the same. The change of energy transfer with wave length varies more slowly, however, when the length of coupling between the two propagation paths is equal to an odd number of quarter-wave lengths at the mean wave length in the range.

For convenience of description of the invention, one of the transmission lines has heretofore been referred to as a "side" line and the other as a "main" line. Since the electric and magnetic coupling between the lines is effective, however, to transfer wave-signal energy from the main line to the side line or vice versa, it will be apparent that either transmission line may be the "main" line and the other the "side" line.

It will be apparent from the foregoing description of the invention that a wave-signal translating system embodying the invention has the advantage that wave-signal energy is transferred from free space to a wave guide or from one wave guide to another with the direction and directional magnitude of wave-signal energy flow in the second wave guide selectively dependent only upon an individual direction and directional magnitude of energy flow in free space or in the first wave guide. The translating system of the present invention has the additional advantage that it easily and readily enables accurate measurements to be made of the individual wave-signal energy flowing in each of two directions along a wave-propagation path, such as a path in free space or a path established along a wave guide. Further, the wave-signal translating system of the invention permits a selected portion of the wave-signal energy traveling along a wave guide to be abstracted therefrom selectively in accordance with the direction of energy flow along such wave guide. Certain of the modified forms of the invention have the advantage for certain applications that their translation characteristics may easily and readily be made that of a band-pass selector either to translate with little attenuation wave signals within a range of wave lengths or, conversely, to attenuate wave signals within a range of wave lengths.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A wave-signal translating system adapted to be positioned along a path of translation of wave signals having a substantially planar wave front comprising, a wave guide having its longitudinal axis substantially parallel to said path for translating wave signals along a second path with substantially the same velocity as that of said first path and including a longitudinally extending elongated aperture, said aperture having a length equal approximately to a quarter wave length at a selected wave length of said first-mentioned wave signals, and said wave guide including at least two conductors having approximately parallel substantially dissipationless conductor portions separated by a distance much less than their length and much less than the wave length of said wave signals, said paths adapted to have distributed magnetic and electric coupling therebetween through said aperture, and means for terminating said wave guide at one end thereof by an impedance having such value that substantially no wave-signal energy is developed at the other end of said wave guide in response to a pure traveling wave traveling through said first-mentioned path in the region of said parallel portions and in a direction corresponding to the direction from said one end to said other end of said wave guide.

2. A wave-signal translating system adapted to be positioned along a path of translation of wave signals having a substantially planar wave front comprising, a coaxial transmission line having its longitudinal axis substantially parallel to said path for translating wave signals along a second path with substantially the same velocity as that of said first path and including at least two coaxially supported conductors having approximately parallel substantially dissipationless conductor portions separated by a distance much less than their length and much less than the wave length of said wave signals, the outer conductor of said transmission line having an elongated aperture having a length equal approximately to a quarter wave length at a selected wave length of said first-mentioned wave signals for effecting magnetic and electric coupling between said paths only over limited approximately parallel portions thereof, and means for terminating said coaxial transmission line at one end thereof by an impedance having such value that substantially no wave-signal energy is developed at the other end of said coaxial transmission line in response to a pure traveling wave traveling through said first-mentioned path in the region of said parallel portions and in a direction corresponding to the direction from said one end to said other end of said coaxial transmission line.

3. A wave-signal translating system adapted to be positioned along a path of translation of wave signals having a substantially planar wave front comprising, a coaxial transmission line having its longitudinal axis substantially parallel to said path for translating wave signals along a second path with substantially the same velocity as that of said first path and including at least two coaxially supported conductors having approximately parallel substantially dissipationless conductor portions separated by a distance much less than their length and much less than the wave length of said wave signals, the outer conductor of said transmission line having a longitudinally extending elongated aperture having a length equal approximately to a quarter wave length at a selected wave length of said first-mentioned wave signals for effecting magnetic and electrical coupling between said paths over a longitudinal length thereof equal approximately to an odd number of quarter-wave lengths at a selected wave length of wave signals translated through said first-mentioned path, and means for terminating said coaxial transmission line at one end thereof by an impedance having such value that substantially no wave-signal energy is developed at the other end of said coaxial transmission line in response to a pure traveling wave traveling through said first-mentioned path in the region of said parallel portions and in a direction corresponding to the direction from said one end to said other end of said coaxial transmission line.

4. A wave-signal translating system adapted to be positioned along a path of translation of wave signals having a substantially planar wave front comprising, a coaxial transmission line having its longitudinal axis substantially parallel to said path for translating wave signals along a second path with substantially the same velocity as that of said first path and including at least two coaxially supported conductors having approximately parallel substantialy dissipationless conductor portions separated by a distance much less than their length and much less than the wave length of said wave signals, the outer conductor of said transmission line having a longitudinally extending elongated aperture having a length equal approximately to a quarter wave length at a selected wave length of said first-mentioned wave signals for effecting magnetic and electric coupling between said paths over a longitudinal length thereof equal approximately to a quarter-wave length at a selected wave length of wave signals translated through said first-mentioned path, and means for terminating said coaxial transmission line at one end thereof by an impedance having such value that substantially no wave-signal energy is developed at the other end of said coaxial transmission line in response to a pure traveling wave traveling through said first-mentioned path in the region of said parallel portions and in a direction corresponding to the direction from said one end to said other end of said coaxial transmission line.

5. A wave-signal translating system comprising, a first coaxial transmission line for effecting the translation of wave signals along a first pre-determined path and with a substantially planar wave front, a second coaxial transmission line for translating wave signals along a second predetermined path with substantially the same velocity as that of said first path, said lines each including at least two conductors having approximately parallel substantially dissipationless conductor portions separated by a distance much less than their length and much less than the wave length of said wave signals and said lines having therebetween at the region of said conductor portions a common intercommunicating longitudinal aperture having a length equal approximately to a quarter wave length at a selected wave length of said first-mentioned wave signals for effecting magnetic and electric coupling between said lines only over approximately parallel portions thereof, and means for terminating said second transmission line at one end thereof by an impedance having such value that substantially no wave-signal energy is developed at the other end of said second transmission line in response to a pure traveling wave traveling through said first transmission line in the region of said parallel portions and in a direction corresponding to the direction from said one end to said other end of said second transmission line.

6. A wave-signal translating system comprising, a first coaxial transmission line for effecting the translation of wave signals along a first predetermined path and with a substantially planar wave front, a second coaxial transmission line positioned in coaxial relation to said first line with a conductor common to both of said lines for translating wave signals along a second predetermined path with substantially the same velocity as that of said first path and including at least two approximately parallel substantially dissipationless conductor portions separated by a distance much less than their length and much less than the wave length of said wave signals, said common conductor having an elongated aperture having a length equal approximately to a quarter wave length at a selected wave length of said first-mentioned wave signals for effecting magnetic and electric coupling between said lines only over approximately parallel portions thereof, and means for terminating said second transmission line at one end thereof by an impedance having such value that substantially no wave-signal energy is developed at the other end of said second transmission line in response to a pure traveling wave traveling through said first transmission line in the region of said parallel portions and in a direction corresponding to the direction from said one end to said other end of said second transmission line.

7. A wave-signal translating system comprising, a first coaxial transmission line for effecting the translation of wave signals along a first predetermined path and with a substantially planar wave front, a second coaxial transmission line having an outer conductor spaced in concentric relation to the outer conductor of said first line to utilize said last-mentioned conductor as the inner conductor of said second line and to effect translation of wave signals along a second path with substantially the same velocity as that of said first path, said lines each including at least two approximately parallel substantially dissipationless conductor portions separated by a distance much less than their length and much less than the wave length of said wave signals, and said last-mentioned conductor having an elongated aperture having a length equal approximately to a quarter wave length at a selected wave length of said first-mentioned wave signals for effecting magnetic and electric coupling between said lines only over approximately parallel portions thereof, and means for terminating said second transmission line at one end thereof by an impedance having such value that substantially no wave-signal energy is developed at the other end of said second transmission line in response to a pure traveling wave traveling through said first transmission line in the region of said parallel portions and in a direction corresponding to the direction from said one end to said other end of said second transmission line.

8. A wave-signal translating system comprising, a first transmission line having inner and outer conductors coaxially arranged and adapted to translate wave signals along a predetermined path between said conductors, a second transmission line having a length equal approximately to an odd number of quarter wave lengths at a selected wave length of wave signals translated along said path, said second transmission line also comprising a hollow conductor open at both ends and coaxially surrounding the inner conductor of said first line but spaced from both conductors thereof, said transmission lines having magnetic and electric coupling therebetween only over limited approximately parallel portions thereof, and means for terminating said second transmission line at one end thereof by an impedance having such value that substantially no wave-signal energy is developed at the other end of said second transmission line in response to a pure traveling wave traveling through said first transmission line at the region of said parallel portions and in a direction corresponding to the direction from said one end to said other end of said second transmission line.

9. A wave-signal translating system comprising, a first transmission line having inner and outer conductors coaxially arranged and adapted to translate wave signals along a predetermined path between said conductors, a second transmission line having a length equal approximately to an odd number of quarter wave lengths at a selected wave length of wave signals translated along said path, said second transmission line also comprising a hollow conductor open at both ends and coaxially surrounding the inner conductor of said first line but spaced from both conductors thereof, said transmission lines having conductor sizes so selected over the length of said second line as to provide a combined impedance for said lines substantially equal to the characteristic impedance of said first line at a point therealong spaced from said second line and to establish between said lines a desired amount of magnetic and electric coupling, and means for terminating said second transmission line at one end thereof by an impedance having such value that substantially no wave-signal energy is developed at the other end of said second transmission line in response to a pure traveling wave traveling through said first transmission line in a direction corresponding to the direction from said one end to said other end of said second transmission line.

10. A wave-signal translating system comprising, a first transmission line having inner and outer conductors coaxially arranged and adapted to translate wave signals along a predetermined path between said conductors, a second transmission line having a length equal approximately to an odd number of quarter wave lengths at a selected wave length of wave signals translated along said path, said second transmission line also comprising a hollow conductor open at both ends and coaxially surrounding the inner conductor of said first line but spaced from both conductors thereof, said transmission lines having conductor sizes so selected over the length of said second line as to provide a combined impedance for said lines substantially equal to the characteristic impedance of said first line at a point therealong spaced from said second line and to establish between said lines a desired amount of magnetic and electric coupling, and resistive means coupled between said hollow conductor of said second line at one end thereof and one conductor of said first line for terminating said second line by a resistive impedance having such value that substantially no wave-signal energy is developed at the other end of said second line in response to a pure traveling wave traveling through said first line in a direction corresponding to the direction from said one end to said other end of said second line.

11. A wave-signal translating system comprising, a first transmission line having inner and outer conductors coaxially arranged and adapted to translate wave signals along a predetermined path between said conductors, a second transmission line having a length equal approximately to an odd number of quarter wave lengths at a selected wave length of wave signals translated along said path, said second transmission line also comprising a hollow conductor open at both ends and coaxially surrounding the inner conductor of said first line but spaced from both conductors thereof, said transmission lines having magnetic and electric coupling therebetween only over a length thereof approximately equal to said odd number of quarter-wave lengths to provide maximum coupling from said first line to said second line for any given conductor sizes for said lines, and means for terminating said second transmission line at one end thereof by an impedance having such value that substantially no wave-signal energy is developed at the other end of said second transmission line in response to a pure traveling wave traveling through said first transmission line in a direction corresponding to the direction from said one end to said other end of said second transmission line.

HAROLD A. WHEELER.

REFERENCES CITED

The following references are of record in the file of this patent:

UNITED STATES PATENTS

| Number | Name | Date |
|---|---|---|
| 2,239,905 | Trevor | Apr. 29, 1941 |
| 2,423,390 | Korman | July 1, 1947 |
| 2,423,416 | Sontheimer et al. | July 1, 1947 |
| 2,423,526 | Sontheimer | July 8, 1947 |
| 2,478,317 | Purcell | Aug. 9, 1949 |
| 2,519,734 | Beth | Aug. 22, 1950 |
| 2,562,281 | Mumford | July 31, 1951 |

OTHER REFERENCES

Principles of Radar, M. I. T. Radar School, McGraw-Hill, January 1946, pages 10-32 and 10-33.

"Radio Engineering," by Terman. Published in 1947 by McGraw-Hill Book Company, Inc. Copy in Division 69.

"Technique of Microwave Measurements," M. I. T. series. Published in 1947 by McGraw-Hill Book Company, Inc.